United States Patent
Lee

(10) Patent No.: US 6,877,090 B2
(45) Date of Patent: Apr. 5, 2005

(54) BRANCH PREDICTOR SUITABLE FOR MULTI-PROCESSING MICROPROCESSOR

(75) Inventor: Hoi-Jin Lee, Sungnam-shi (KR)

(73) Assignee: Samsung Electronics Co., Ltd. (KR)

( * ) Notice: Subject to any disclaimer, the term of this patent is extended or adjusted under 35 U.S.C. 154(b) by 497 days.

(21) Appl. No.: 09/775,230

(22) Filed: Feb. 1, 2001

(65) Prior Publication Data

US 2001/0021974 A1 Sep. 13, 2001

(30) Foreign Application Priority Data

Feb. 1, 2000 (KR) .......................................... 00-04981

(51) Int. Cl.⁷ .............................................. G06F 9/00
(52) U.S. Cl. .................................... 712/239; 712/240
(58) Field of Search ................................ 712/239, 240

(56) References Cited

U.S. PATENT DOCUMENTS

| 5,742,805 | A | * | 4/1998 | Kulkarni et al. | ............. 712/239 |
| 5,890,008 | A | * | 3/1999 | Panwar et al. | ................ 712/15 |
| 6,272,623 | B1 | * | 8/2001 | Talcott | ........................ 712/239 |
| 6,526,502 | B1 | * | 2/2003 | Col et al. | .................... 712/239 |
| 6,715,064 | B1 | * | 3/2004 | D'Sa et al. | ................. 712/240 |

\* cited by examiner

*Primary Examiner*—Eddie Chan
*Assistant Examiner*—Aimee J. Li
(74) *Attorney, Agent, or Firm*—Mills & Onello LLP

(57) ABSTRACT

A branch predictor generates an index to access a branch prediction table storing branch prediction reference data therein. The index is generated in response to a combination of a branch history, a branch instruction address, and a process ID. The process ID is derived from one of multiple processes operating on a multi-processing computer with which the branch predictor is associated.

14 Claims, 3 Drawing Sheets

BRANCH PREDICTOR SUITABLE FOR MULTI-PROCESSING MICROPROCESSOR

This application relies for priority upon Korean Patent Application No. 2000-04981, filed on Feb. 1, 2000, the contents of which are herein incorporated by reference in their entirety.

FIELD OF THE INVENTION

The present invention generally relates to a branch predictor of a microprocessor. More particularly, the present invention relates to a branch predictor that has a high hit ratio in a multi-processing environment.

BACKGROUND OF THE INVENTION

Primary processors are designed to sequentially execute instructions. A useful form of the processor is the pipeline processing architecture. In a basic pipeline processor, the pipeline includes the steps of, for example, fetching, decoding, and executing. The instructions running on the pipeline chain are conducted in an overlapped relationship with each other.

This is because, when a branch instruction is fetched, an address associated with the next instruction to be executed (fetched) at the next cycle cannot be promptly known. This causes the fetch step to be stalled and delayed until a decision for the branch target address is completed. Since a branch address is generally created in an execution step of previous instructions which generate condition codes, the fetch of the next instruction is stalled during the decoding and executing steps of the previous instructions. If the branch instruction is completely executed, it is possible to know a branch direction and safely fetch an instruction at a real target address. That is, it is determined whether the condition of a conditional branch instruction is true or not. Further, there is a time delay of one cycle, or more, until the value of the next program counter is determined in order to fetch the next instruction to be executed.

In order to utilize such a wasteful cycle, "branch prediction" is adopted. The branch prediction process predicts whether a conditional branch instruction branches, performing a pipeline. By checking whether a conditional branch instruction is true or not, the branch prediction optionally sets and progresses an address that is going to branch. Following this, the next instructions are consecutively executed while counting the address. If the branch prediction is "hit", executed instructions will correctly be executed and the pipeline will not stall. If the branch prediction is "miss", an address must again branch to the branch target. At this time, additional delay is created so as to flush incorrectly a false sequence of instructions and re-execute correctly a true sequence of instructions. When branch prediction fails, cycles that have been predicted and progressed become useless, which are referred to as a "branch misprediction penalty".

As techniques for reducing the branch misprediction penalty, static branch prediction and dynamic branch prediction have been developed. In static branch prediction, "TAKEN" (branch to a branch target address) and "NOT-TAKEN" (proceed to the next instruction of a branch instruction) qualifiers of a branch instruction are checked to rearrange a program code. In dynamic branch prediction, the "TAKEN" and "NOT-TAKEN" qualifiers are determined by means of history during the program execution. Generally, a hit ratio of the dynamic branch prediction is higher than that of the static branch prediction.

As a specific method for realizing the dynamic branch prediction, the "per-address history" and "global history" schemes have been developed. The per-address history scheme has an excellent hit ratio to loop instructions (e.g., WHILE, FOR, DO, and LOOP) because each address of the branch instructions has a counter. The global history scheme has an excellent hit ratio to an adjacent branch instruction (e.g., IF-THEN). Taking into consideration the price in terms of hardware, the global history scheme is preferred to the per-address history scheme. A branch predictor based upon the global history scheme is disclosed in "Combining Branch Predictors", Technical Note TN-36 of Western Research Laboratory, June 1993, Scott McFarling.

A conventional branch predictor is designed by considering only a branch operation to a single process. That is, a process ID is not considered. Therefore, the hit ratio of the dynamic branch prediction becomes low under the multi-processing environment where a plurality of processes are executed at the same time. If the hit ratio becomes low, the branch misprediction penalty is increased to lengthen program execution time.

SUMMARY OF THE INVENTION

It is therefore an object of the present invention to provide a branch predictor having an excellent hit ratio in a multi-processing environment where a plurality of processes are performed at the same time, for example in a single microprocessor.

According to one aspect of the invention, a branch predictor for use in a multi-processing environment of a microprocessor includes a history register for storing a branch history of previous sequential branch instructions; a hash logic for creating an index from a combination of a process ID corresponding to a current branch instruction, an address of the current branch instruction, and the branch history; a branch prediction table for storage of branch prediction reference data, and for outputting branch prediction reference data corresponding to the created index in the hash logic; an address selection circuit for selecting and outputting one of target addresses known from the current branch instruction and a next instruction of the current branch instruction as a branch prediction address, in response to the branch prediction reference data outputted from the branch prediction table; and a branch prediction result tester for updating the stored branch history in the history register and the stored branch prediction reference data in the branch prediction table, in response to a real branch address and the branch prediction address according to an execution result of the current branch instruction.

The branch prediction table is composed of a plurality of up/down saturating counters that can be selected by the created index from the hash logic. The history register is composed of a shift register. The hash logic creates the index by performing an exclusive-OR operation to the process ID corresponding to the current branch instruction, the address of the current branch instruction, and the branch history. The branch prediction result tester includes a comparator for checking whether a real branch address according to an execution result of the current branch instruction matches with the branch prediction address, and creating a control signal corresponding to the checking result. The comparator generates a control signal of logic "1" if the real branch address matches with the branch prediction address, and generates a control signal of logic "0" if the real branch address does not match therewith. The address selection circuit changes and outputs the real branch address to the branch address when the control signal is logic "0". The counter counts up when the control signal is logic "1", and counts down when the control signal is logic "0". The shift register shifts the branch prediction result toward a first direction by inserting the control signal.

According to another aspect of the present invention, there is provided a decision (or prediction) method of a branch address of a conditional branch instruction with reference to a branch prediction table for storing branch prediction reference data. The branch prediction method includes the steps of creating an index to access the branch prediction table from combination of a process ID corresponding to the conditional branch instruction, an address of the conditional branch instruction, and previous sequential branch instructions; reading branch prediction reference data from the branch prediction table in response to the index; selectively outputting one of target addresses known from the conditional branch instruction and a next address of the conditional branch instruction in response to the branch prediction reference data; and updating the branch history and the stored branch prediction reference data in the branch prediction table in response to a real branch address according to an execution result of the conditional branch instruction.

The branch prediction method further includes the steps of checking whether the real branch address matches with the branch prediction address, and changing and outputting the corrected branch address to the branch address if the real branch address does not match therewith.

BRIEF DESCRIPTION OF THE DRAWINGS

The foregoing and other objects, features, and advantages of the present invention will be apparent from the following more particular description of preferred embodiments of the invention as shown in the accompanying drawings, in which.

DETAILED DESCRIPTION OF PREFERRED EMBODIMENTS

Figure 1:
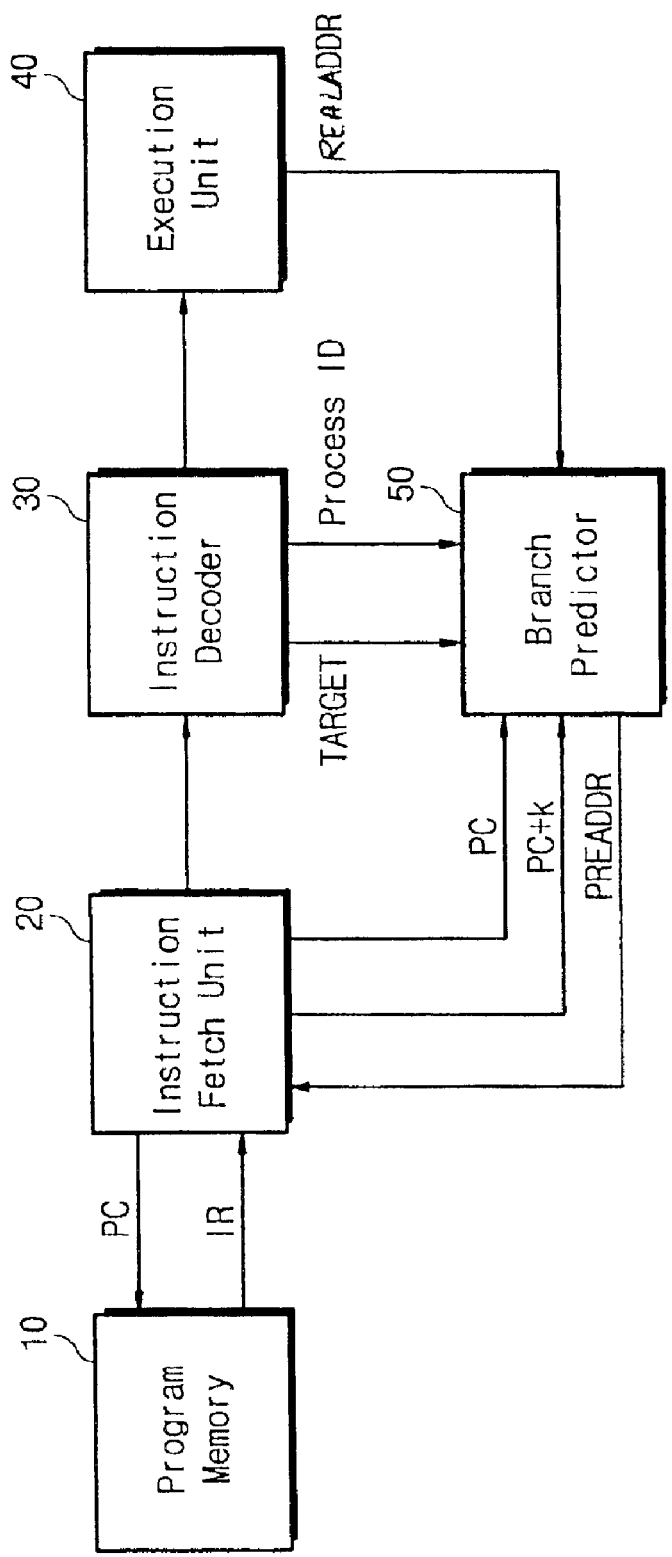
FIG. 1 is a block diagram showing primary elements of a microprocessor in accordance with the present invention.

Primary components of a microprocessor according to the invention are schematically shown in FIG. 1. The microprocessor includes a program memory 10, an instruction fetch unit 20, an instruction decoder 30, an execution unit 40, and a branch predictor 50. In each cycle, the program memory 10 supplies an instruction to the instruction fetch unit 20 in response to an address from the instruction fetch unit 20. The instruction decoder 30 receives and decodes a fetched instruction in the instruction fetch unit 20, and then supplies the decoded instruction to the execution unit 40. In this case, if the decoded instruction is a conditional branch instruction, the decoder 30 supplies a corresponding process ID and a target address TARGET to a branch predictor.

The process ID is composed of, for example, 4 bits (being able to indicate an ID corresponding to, maximum, 16 processes) and is used for indicating a process corresponding to an instruction that is currently decoded in the instruction decoder 30. For example, if the currently decoded instruction is an instruction corresponding to a 0th process, the process ID has a value "0000". If it is an instruction corresponding to a first process, the process ID has a value "0001".

The branch predictor 50 receives a process ID supplied from the instruction decoder 30 and an address PC of a branch instruction supplied from the instruction fetch unit 20, and generates a branch prediction address PREADDR based upon the global history scheme. The prediction address PREADDR is supplied to the instruction fetch unit 20. The execution unit 40 checks whether the condition of the decoded conditional branch instruction is true or false. According to the result, the unit 40 generates a real branch address REALADDR. The branch predictor 40 checks whether PREADDR matches with REALADDR. If so, branch prediction is determined as a "hit", and the process continues. If not, the branch prediction is a "miss". Therefore, PREADDR is given up and REALADDR is used so that REALADDR may branch again. A detailed circuit diagram of such a branch predictor is illustrated in FIG. 2.

Figure 2:
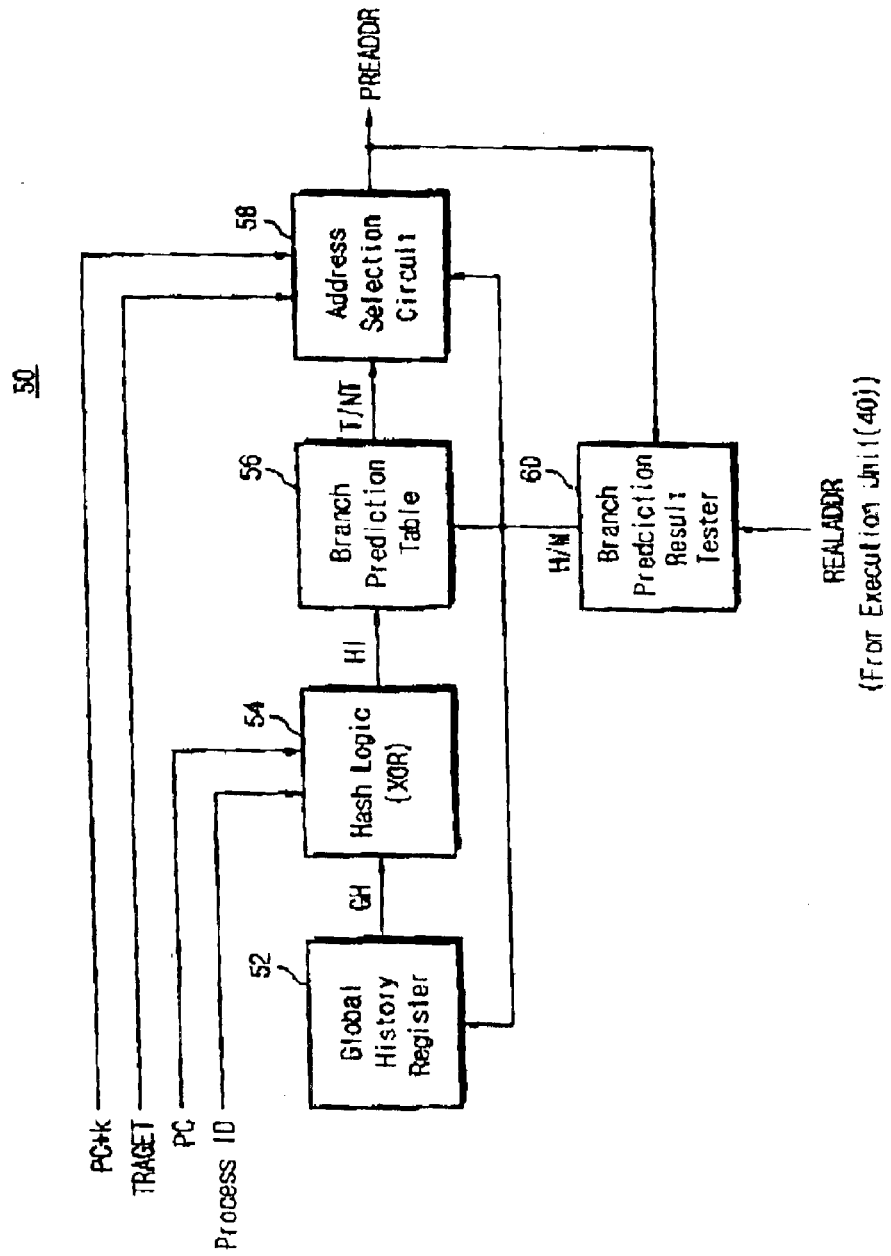
FIG. 2 is a detailed circuit diagram of the branch predictor shown in FIG. 1.

Referring now to FIG. 2, a branch predictor 50 based upon a global history process includes a history register 52, a hash logic 54, a branch prediction table 56, an address selection circuit 58, and a branch prediction result tester 60.

The history register 52 may be 8 bits in width, for example, and stores a branch history GH (i.e., hit/miss of branch prediction) from a current branch instruction to an 8th previous branch instruction. If branch prediction is hit, each bit of the history register 52 has a binary value "1". If branch prediction is a miss, each bit of the history register 52 has a binary value "0".

The hash logic 54 receives a process ID supplied from the instruction decoder 30, an address PC of a branch instruction supplied from the instruction fetch unit 20, and a branch history GH stored in the history register 52, and performs a hash algorithm. The hash logic 54 is composed of an exclusive-OR logic circuit, and outputs PC and GH by performing an exclusive-OR operation. Since the process ID is composed of 4 bits, the operation is performed by adding 4-bit data "0000" to a highest bit of the process ID so that 4 bits may be equal to 8 bits of the history GH and a target address TARGET. The following table <TABLE 1> illustrates an exclusive-OR operation result of GH, the process ID, and PC.

TABLE 1

| Branch History (GH) | Process ID (ID) | Address of Branch Instruction (PC) | Gshare 8/8 (Prior Art, HI) | Hash Index (HI) |
|---|---|---|---|---|
| 00000001 | 0000 | 00000000 | 00000001 | 00000001 |
| 00000000 | 0000 | 00000000 | 00000000 | 00000000 |
| 00000001 | 0010 | 00000000 | 00000001 | 00000011 |
| 00000000 | 0010 | 00000000 | 00000000 | 00000010 |
| 00000000 | 0000 | 11111111 | 11111111 | 11111111 |
| 10000000 | 0000 | 11111111 | 01111111 | 01111111 |
| 00000000 | 0010 | 11111111 | 11111111 | 11111101 |
| 10000000 | 0010 | 11111111 | 01111111 | 01111101 |

As shown in <TABLE 1>, two hash indexes are compared with each other in case of a global history [7:0], a process ID [3:0], and an address of a branch instruction [7:0]. The first is based upon "(an address [7:0] of a branch instruction) XOR (a global history [7:0])" operation of a Gshare 8/8, which is a form of reference branch predictor. The second is based upon "(an address [7:0] of a branch instruction) XOR (a global history [7:0]) XOR (0000, a process ID [3:0]" operation using a process ID of this invention.

When selecting a counter that will be regarded as a reference in order to select "TAKEN" and "NOT-TAKEN" that is branch prediction reference data, the conventional Gshare approach cannot discriminate changed process IDs. Thus, counters used as a reference must be flushed. However, since the changed process IDs can be discriminated in the present invention, a reference associated with a previous process ID need not be flushed. That is, the aliasing effect becomes weak in the branch prediction, reducing execution time and enhancing the hit ratio of the branch prediction.

Pattern HI, that is output from the hash logic 54, is supplied to an index signal of the branch prediction table 56. The table 56 stores a plurality of branch prediction reference data to determine "TAKEN" (branch to a target address TARGET of the branch instruction) or "NOT-TAKEN" (execution of the next instruction of the instruction). The table 56 is composed of N-numbered counters each being selected by indexes that are different from one another. Assuming the pattern H1 to be 8 bits, the table 56 may be composed of a maximum of $2^8$ counters. Each of the counters is a 2-bit up/down saturating counter. As well known to those skilled in the art, such a 2-bit up/down saturating counter has four states "00", "01", "10", and "11", which are changed in response to an up/down control signal. Although a down control signal inputs in "00", the 2-bit up/down saturating counter holds "00". And, although an up control signal inputs in "11", the 2-bit up/down saturating counter holds "11".

"TAKEN" or "NOT-TAKEN" depending on the prediction reference data stored in the counter is shown in the following table [TABLE 2].

TABLE 2

| Branch Prediction Reference Data | Prediction of TAKEN/NOT-TAKEN |
|---|---|
| 0 0 | NOT-TAKEN |
| 0 1 | NOT-TAKEN |
| 1 0 | TAKEN |
| 1 1 | TAKEN |

Out of the branch prediction reference data stored in a counter selected by the pattern H1 that outputs from the hash logic 54, only the highest bit MSB is supplied to the address selection logic 58.

If a 1-bit branch prediction value supplied from the branch prediction table 56 is "0", the address selection circuit 58 selects an address PC+k (k denoting an instruction length, unit: byte). If the value is "1", the address selection circuit 58 selects and outputs a target address TARGET known from a branch instruction supplied from the instruction decoder 30.

The branch prediction result tester 60 checks whether a branch prediction value T/NT matches with a conditional branch check result of the execution unit 40. If so (i.e., branch prediction is a "hit"), the tester 60 outputs "1" as a control signal H/M. If not (i.e., branch prediction is a "miss"), the tester 60 outputs "0" as a control signal H/M.

The history register 52, which receives a control signal H/M having a value "0" or "1" generated according to the manner described above, inserts the control signal H/M into the least significant bit LSB to perform a shift left. For example, if a branch prediction result GH stored in the history register 52 is binary "01101110" and branch prediction to a current branch instruction is hit (i.e., the control signal H/M is "1"), binary "11011101" is stored in the history register 120.

The branch prediction table 56 also receives the control signal H/M having a value of "0" or "1" generated from the branch prediction hit/miss tester 60, and updates the data of a counter selected by input pattern HI output from the hash logic 54. That is, if the control signal H/M is "1", the count is incremented by "1". If the control signal H/M is "0", the count is decremented by "1".

If the control signal H/M is "1", the address selection circuit 58 performs no operation. If the control signal H/M is "0", the circuit 58 changes and outputs a branch prediction address according to the branch prediction reference data T/NT supplied by the branch prediction table 56. That is, if the data T/NT corresponds to "NOT-TAKEN", the circuit 58 changes and outputs an address PC+k of an instruction, which is subsequent to a branch instruction supplied from the instruction fetch unit 20, to generate branch prediction address PREADDR. On the other hand, if the data T/NT corresponds to "TAKEN", the circuit 58 changes and outputs a target address TARGET, which is supplied from the instruction decoder 30, to the branch prediction address PREADDR.

Figure 3:
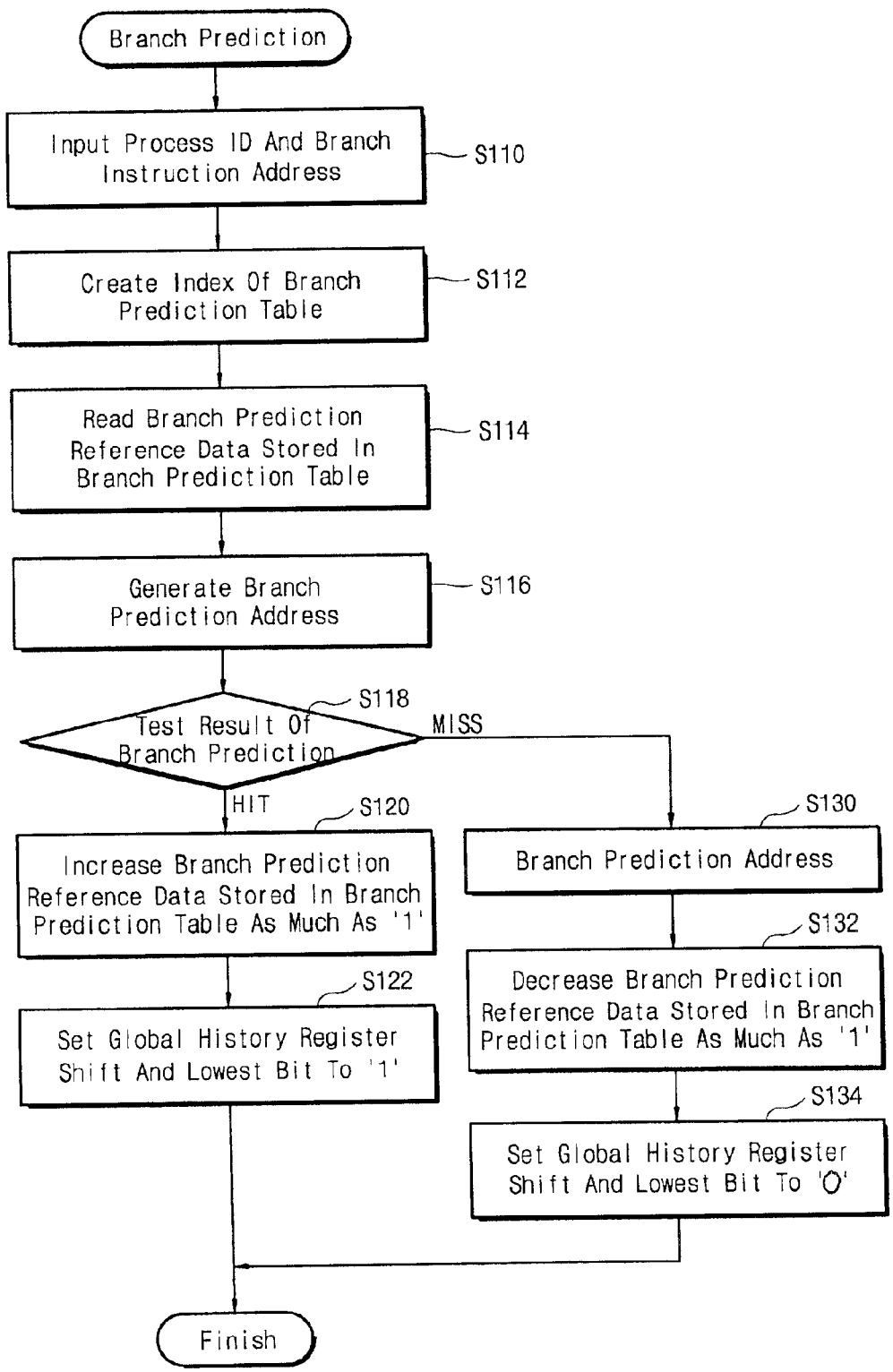
FIG. 3 is a flowchart showing the control steps of a branch predictor in accordance with the present invention.

FIG. 3 is a flowchart illustrating the control steps of a branch predictor according to a preferred embodiment of the invention. When a process ID is input from the instruction decoder 30 and an address PC of a branch instruction is input from an instruction fetch unit 20, a branch predictor 50 initiates a branch prediction operation (step S110).

In step S112, hash logic 54 in the branch predictor 50 performs a hash operation using the process ID supplied from the instruction decoder 30, the address PC supplied from the instruction fetch unit 20, and a branch history GH stored in a history register 52, as sources. Then, an index HI of a branch prediction table 56 is created. The index HI, which is output by the hash logic 54, is a selection signal for selecting one of a plurality of counters composing the branch prediction table 56.

In step S114, branch prediction reference data T/NT is read out from a counter of the branch prediction table that is selected by the index HI.

In step S116, an address selection circuit 58 selects one of a target address TARGET and the next address PC+k of the branch address in response to the data T/NT, generating a branch prediction address PREADDR. An instruction execution unit 40 executes a conditional branch instruction, and then generates a real branch address REALADDR.

In step S118, a branch prediction result tester 60 checks whether REALADDR and PREADDR are matched with each other, to determine whether the branch prediction result is a hit or miss.

Assuming a hit (PREADDR=REALADDR), step S118 proceeds to step S120 wherein the branch prediction reference data stored in the branch prediction table is consolidated by "prediction hit". A "prediction hit information" is inserted into a lowest bit LSB of the branch prediction result stored in history register 52, and a shift left is performed (step S122). For example, if prediction is "TAKEN" and the real result is "TAKEN", "1" is inserted as the prediction hit information. If prediction is "NOT-TAKEN" and the real result is "NOT-TAKEN", "0" is inserted as the prediction hit information.

Assuming a miss, step S118 proceeds to step S130 wherein the address selection circuit 58 changes and outputs a corrected branch address. If the branch prediction is to be a "miss", the circuit 58 changes and outputs TARGET and PC+k to PREADDR. The changed address PREADDR (i.e., REALADDR) is supplied to the instruction fetch unit 20. The branch prediction reference data stored in the branch prediction table 56 is consolidated by the "prediction miss"

(step S132). "Prediction miss information" is inserted into the lowest bit LSB of the branch prediction result, and a shift left is performed (step S134). For example, if prediction is "TAKEN" and the real result is "NOT-TAKEN", "0" is inserted as the prediction miss information. If prediction is "NOT-TAKEN" and the real result is "TAKEN", "1" is inserted as the prediction miss information.

One method for enhancing the hit ratio of branch prediction is to accurately access a branch prediction table 58 that stores branch prediction reference data therein. That is, it is necessary to accurately select a counter storing "TAKEN/NOT-TAKEN" information of a currently decoded branch instruction, out of $2^8$ counters composing the branch prediction table 56.

If a plurality of processes are executed in a single computer system based upon a schedule algorithm with performing context switching, a branch prediction table according to the conventional branch predictor technique becomes useless. Therefore, all the processes become invalid and the branch prediction table must be learned again, requiring the additional steps of updating and adding branch prediction reference data of a branch prediction table in order to enhance the hit ratio of branch prediction. Learning time is inevitably consumed until the branch predictor can bring forth a constant hit ratio of branch prediction. Accordingly, the hit ratio cannot be high in view of an operating system that simultaneously executes a plurality of processes.

Since the branch prediction reference data can selectively be used as a process ID in spite of the context switching, all branch prediction tables need not be invalid. Namely, it is possible to clear a branch predictor learning time that is involved for each context switching. As a result, in the standpoint of the operating system, a hit ratio of the branch predictor 50 is far superior to that of a conventional branch predictor.

The branch predictor 50 creates an index H1 to access the branch prediction table 56, considering a branch prediction result GH, an address PC of a branch instruction, and a process ID. Therefore, the branch predictor 50 has a high hit ratio of branch prediction although a plurality of processes are simultaneously executed in one microprocessor. Since the hit ratio is enhanced, a stall phenomenon of a pipeline is reduced to shorten program execution time.

While a branch prediction based upon a global history scheme is described and illustrated in a preferred embodiment of the present invention, it may be applied to any dynamic branch predictor (e.g., gshare, combined, bi-mode, and per-address). Further, it is understood to those skilled in the art that the foregoing and other changes in form and detail may be made therein without departing from the scope of the invention.

I claim:

1. A branch predictor for a multi-processing computer, able to execute multiple processes, each process having a designated process reference, comprising:
    a global history register for storing a branch history of previous sequential branch instructions for a plurality of the multiple processes;
    a hash logic for creating an index from a combination of a process reference of a process corresponding to a current branch instruction, an address of the current branch instruction, and the branch history for the plurality of the multiple processes;
    a branch prediction table for storing branch prediction reference data, and for outputting branch prediction reference data corresponding to the index created by the hash logic;
    an address selection circuit for selecting one of a target address known from the current branch instruction and a next address of the current branch instruction to generate a branch prediction address, in response to the branch prediction reference data output from the branch prediction table; and
    a branch prediction result tester generating a control signal for updating the branch history stored in the global history register and the branch prediction reference data stored in the branch prediction table, in response to a comparison between a real branch address and the branch prediction address, wherein the address selection circuit generates the branch prediction address further in response to a state of the control signal generated by the branch prediction result tester.

2. The branch predictor of claim 1, wherein the branch prediction table comprises a plurality of up/down saturating counters selected by the index created by the hash logic.

3. The branch predictor of claim 1, wherein the global history register comprises a shift register.

4. The branch predictor of claim 1, wherein the process reference comprises a process ID corresponding to the current branch instruction, and wherein the hash logic creates the index by performing an exclusive-OR operation on the process ID corresponding to the current branch instruction, the address of the current branch instruction, and the branch history.

5. The branch predictor of claim 1, wherein the branch prediction result tester includes a comparator for determining whether the real branch address matches with the branch prediction address, and creates the control signal.

6. The branch predictor of claim 5, wherein the comparator generates a control signal of logic "1" if the real branch address matches with the branch prediction address, and generates a control signal of logic "0" if the real branch address does not match.

7. The branch predictor of claim 6, wherein the address selection circuit changes and outputs the real branch address as the branch prediction address when the control signal is logic "0".

8. The branch predictor of claim 6, wherein the branch prediction table comprises an up/down counter, and wherein the up/down counter increments when the control signal is logic "1", and wherein the up/down counter decrements when the control signal is logic "0".

9. The branch predictor of claim 6, wherein the global history register comprises a shift register, and wherein the shift register shifts the branch prediction result in a first direction by inserting the control signal.

10. The branch predictor of claim 1, wherein the address selection circuit generates the branch prediction address when the control signal is in a first state, and wherein the address selection circuit performs no operation when the control signal is in a second state.

11. A method of predicting a branch address of a conditional branch instruction with reference to a branch prediction table for storing branch prediction reference data in a multi-processing computer able to execute multiple processes, each having a designated process ID, the method comprising the steps of:
    creating an index to access the branch prediction table from a combination of a process ID oh process corresponding to the conditional branch instruction, an address of the conditional branch instruction, and a branch history comprising previous sequential branch instructions for a plurality of the multiple processes;
    reading branch prediction reference data from the branch prediction table in response to the index;

selectively outputting one of a target address known from the conditional branch instruction and a next address of the conditional branch instruction to generate a branch prediction address, in response to the branch prediction reference data, and further in response to a state of a control signal;

generating the control signal in response to a comparison between a real branch address and the branch prediction address; and updating the branch history and the stored branch prediction reference data in the branch prediction table in response to the control signal.

12. The method of claim 11 further comprising the steps of:

determining whether the real branch address matches with the branch prediction address; and changing and outputting a corrected branch address as the branch prediction address if the real branch address does not match therewith.

13. The method of claim 11, wherein creating the index comprises performing an exclusive-OR operation on the process ID of the process corresponding to the conditional branch instruction, the address of the conditional branch instruction, and the branch history comprising previous sequential branch instructions.

14. The method of claim 11, wherein the branch prediction address is generated when the control signal is in a first state, and wherein the branch prediction address is not generated when the control signal is in a second state.

* * * * *